April 22, 1969   L. C. PRATT ET AL   3,440,465
REVERSING MECHANISM FOR ELECTRIC MOTORS
Filed Oct. 1, 1965
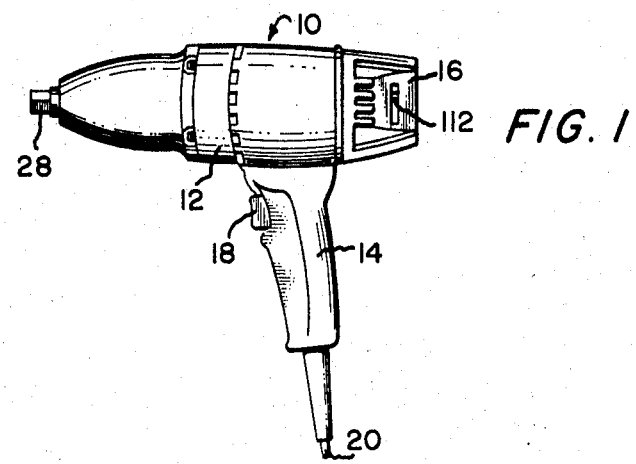
FIG. 1
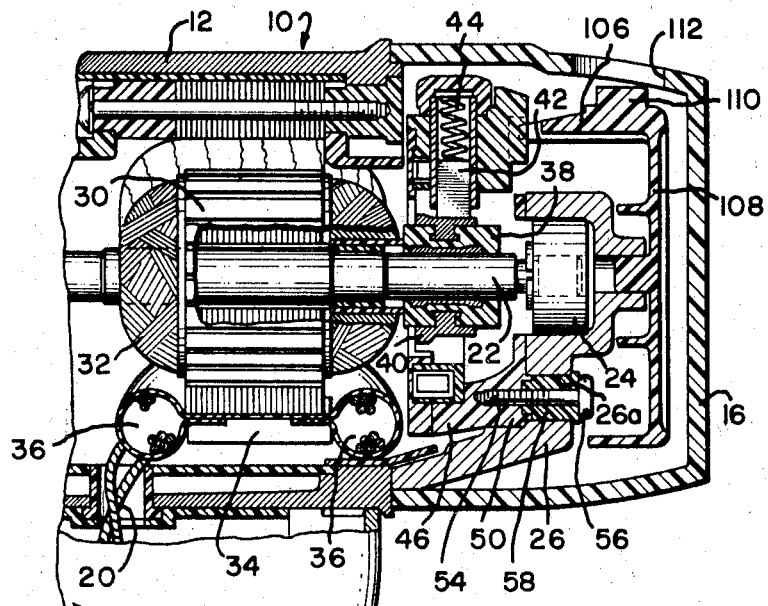
FIG. 2
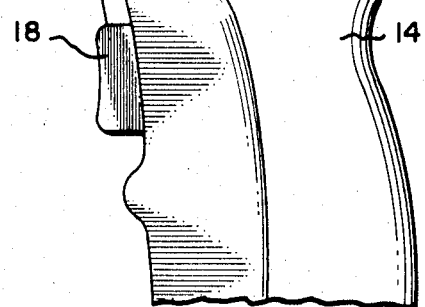
INVENTORS
LEONARD C. PRATT
JOHN R. PROVOST, JR.
JAMES A. DE CARTERET April 22, 1969 L. C. PRATT ET AL 3,440,465
REVERSING MECHANISM FOR ELECTRIC MOTORS
Filed Oct. 1, 1965 Sheet 2 of 4

INVENTORS
LEONARD C. PRATT
JOHN R. PROVOST, JR.
JAMES A. DE CARTERET

INVENTORS
LEONARD C. PRATT
JOHN R. PROVOST, JR.
JAMES A. DE CARTERET

April 22, 1969 L. C. PRATT ET AL 3,440,465
REVERSING MECHANISM FOR ELECTRIC MOTORS
Filed Oct. 1, 1965 Sheet 4 of 4

INVENTORS
LEONARD C. PRATT
JOHN R. PROVOST, JR.
JAMES A. DE CARTERET

United States Patent Office 3,440,465
Patented Apr. 22, 1969

3,440,465
REVERSING MECHANISM FOR ELECTRIC MOTORS
Leonard C. Pratt, Greenfield, John R. Provost, Jr., Turners Falls, and James Alfred De Carteret, Bernardston, Mass., assignors to Millers Falls Company, Greenfield, Mass., a corporation of Massachusetts
Filed Oct. 1, 1965, Ser. No. 492,063
Int. Cl. H02k 13/10, 23/18
U.S. Cl. 310—230                       14 Claims

ABSTRACT OF THE DISCLOSURE

A reversible electric motor provided with a reversing mechanism comprising a support carrying a pair of arcuate blade contacts and a rotatable carrier supporting the commutator brushes. The support and carrier cooperate to enclose the blade contacts and electrically conductive portions of the brush holders from dirt and other foreign matter; and convex projections cooperate with the blade contacts to prevent creepage of the carrier.

---

Figure 3:
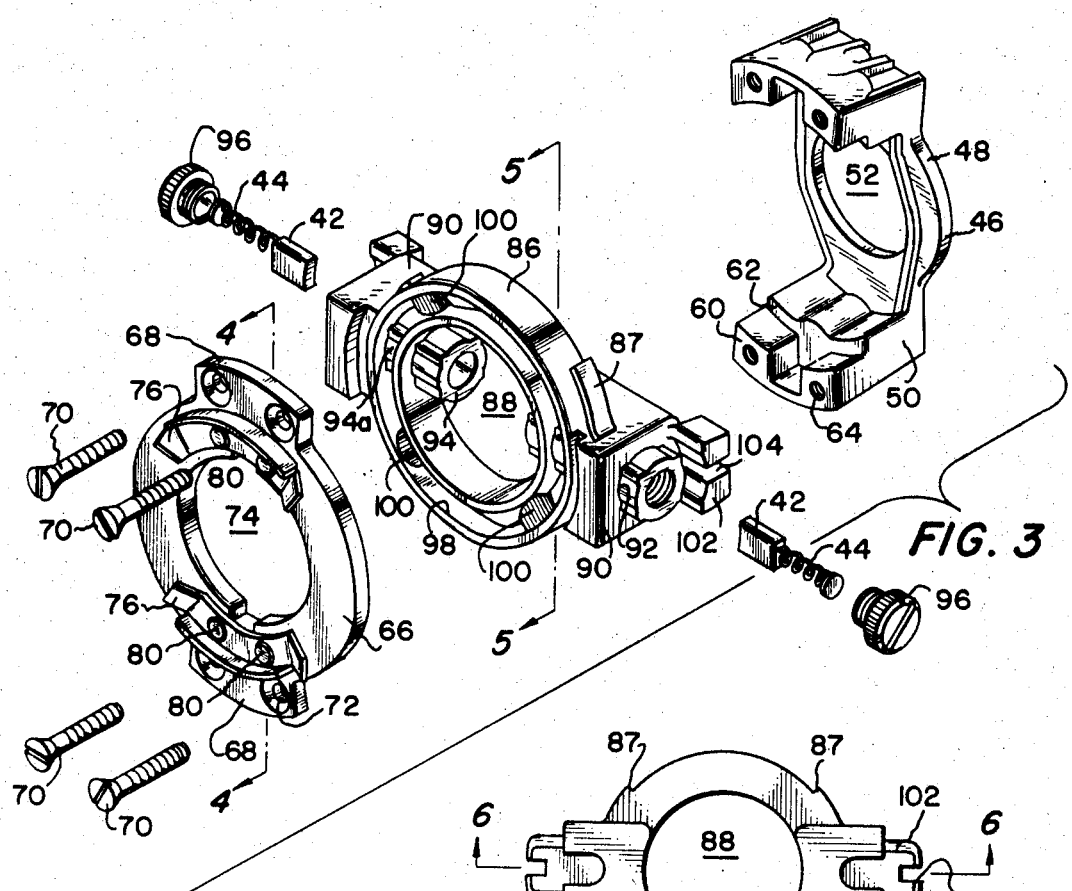

This invention relates to electric motors and has more particular reference to the provision of a new and improved reversing mechanism for a reversible electric motor of the type employed to operate an electric hand tool.

Conventionally, the provision of a reversing mechanism in an electric hand tool has usually necessitated an increase in the size and bulk of the tool. The reversing mechanism, often in the form of a rocker ring switch, has usually been located behind the commutator chamber of the tool electric motor in a position wherein it was vulnerable to possible injury in the event that the tool was dropped. This disposition of the reversing mechanism, in addition to exposing such to possible damage and increasing the size of the tool, required the passage of current carrying leads through the commutator chamber to connect the reversing mechanism to the field coils of the electric motor.

Conventionally, also, the electrical contacts of the reversing mechanism were exposed to carbon dust and other foreign matter which might cause burning and short circuiting of the electric motor. Creepage distances between the engaging electrical contacts were such that there was often an inherent danger that the vibratory forces generated by the electric tool would accidently actuate a reverse of the operation of the electric motor. Attempts to improve these creepage distances, furthermore, usually required an increase in the size of the reversing mechanism and, thus, further increased the size and bulk of the tool equipped with the reversing mechanism.

An object of the present invention is to provide a new and improved reversing mechanism for a reversible electric motor of the type employed to operate an electric hand tool, which reversing mechanism is compact in construction such that, when applied in an electric hand tool, it necessitates no substantial increase in the size of the tool.

Another object of the invention is to provide a new and improved reversing mechanism of the type set forth which is constructed and arranged such that the electrical contacts are completely enclosed and protected from carbon dust and other foreign matter.

Another object is to provide a new and improved reversing mechanism of the type set forth which is constructed and arranged such that the electrical switch contacts make a positive electrical connection and are cleaned to remove any foreign matter that might cause burning and short circuiting of the electric motor.

Another object is to provide a new and improved reversing mechanism of the type set forth which is constructed and arranged to eliminate creepage of the electrical switch contacts, such as might cause accidental motor reversal.

Another object is to provide a new and improved reversing mechanism of the type set forth which is simple and economical in construction and is a complete unit capable of being assembled separately from the electric motor which it reverses.

Another object is to provide a new and improved reversing mechanism of the type set forth which is constructed and arranged to provide double insulation for the electrical current carrying elements.

Other objects and advantages of the invention will be apparent from the following description taken in connection with the accompanying drawings. It will be understood that changes may be made in the details of construction and arrangement of parts shown and described as the preferred form of the invention has been given by way of illustration only. It will, also, be understood that, although the invention has been herein shown and described with primary reference to an electric hand tool, this application of the invention has been given by way of illustration only.

Figure 5:
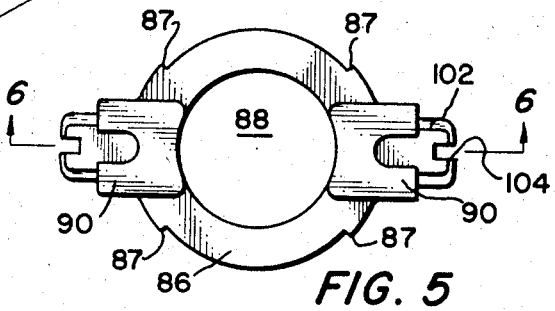
Figure 4:
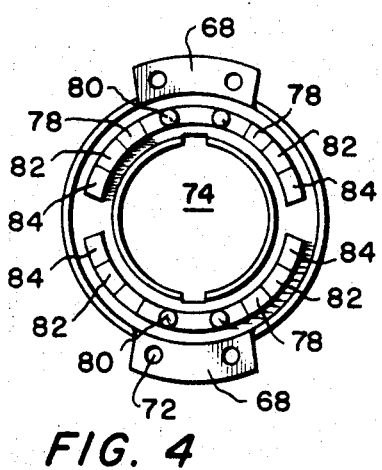
Figure 6:
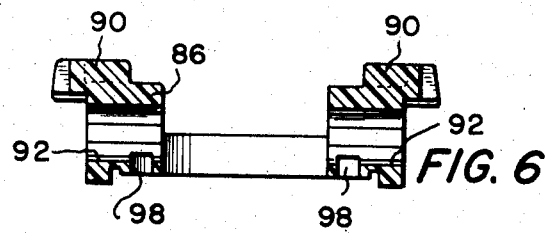
Figure 7:
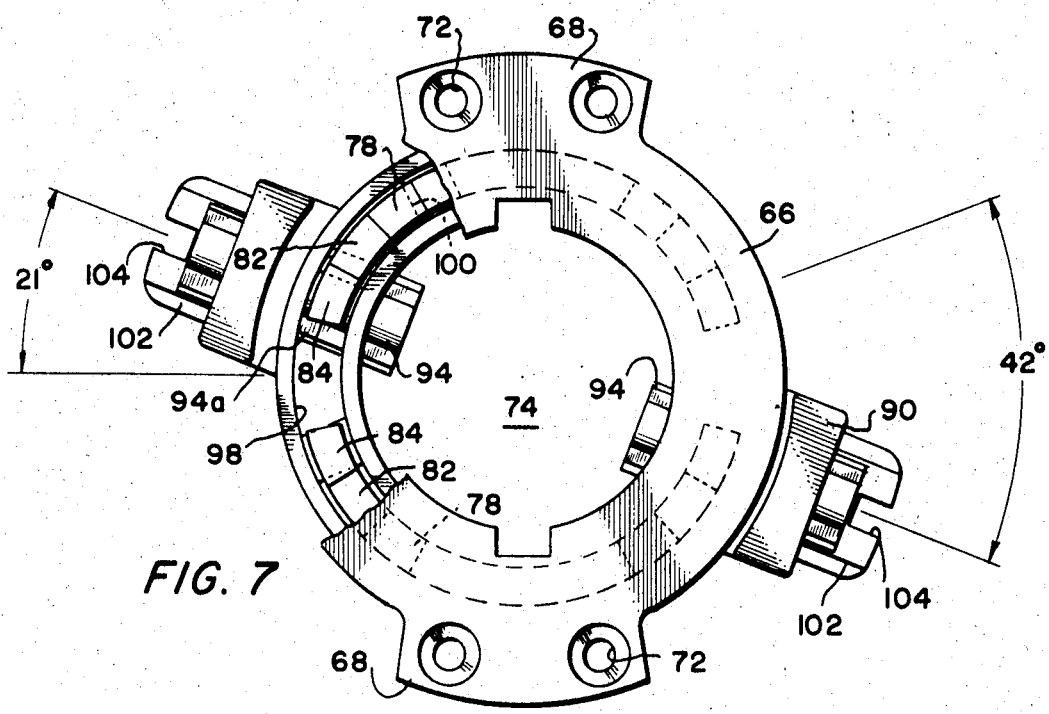
Figure 8:
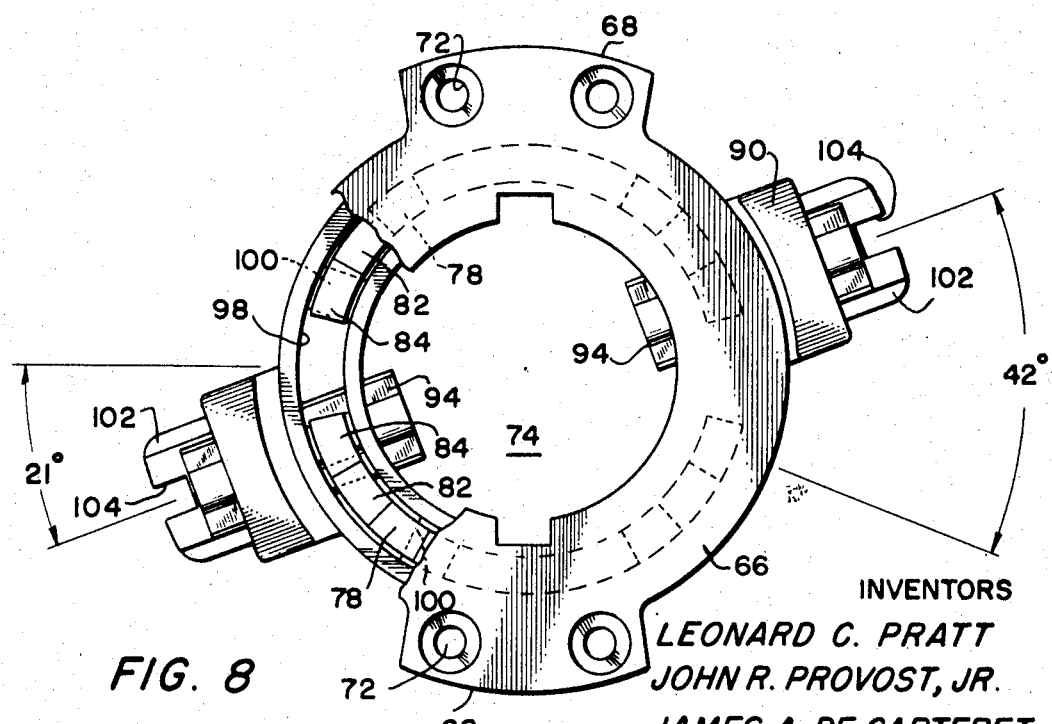
Figure 9:
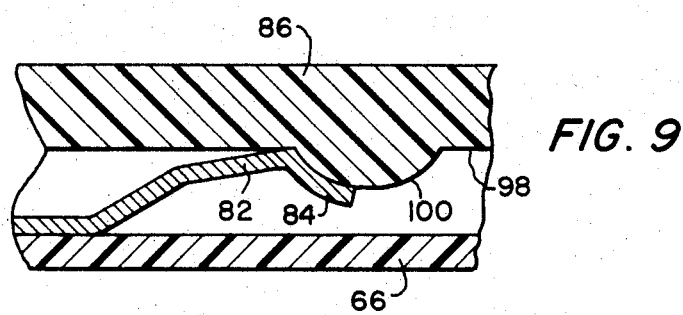
Figure 10:
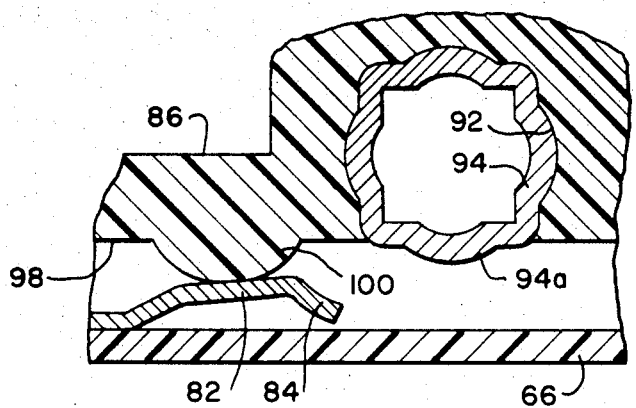
Figure 11:
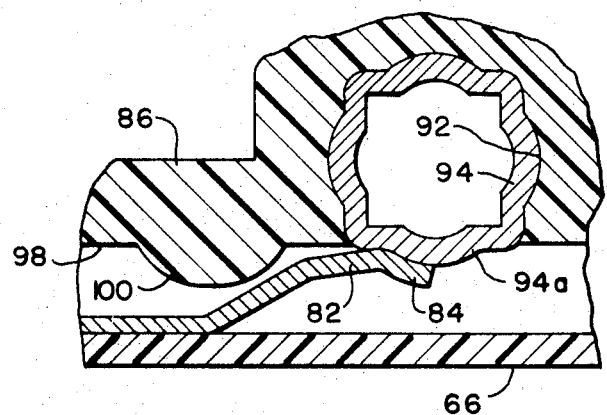

Referring to the drawings:
FIG. 1 is an elevational plan view of an electric hand tool embodying the present invention;
FIG. 2 is an enlarged, fragmentary sectional view of the electric motor of the hand tool illustrated in FIG. 1 with portions thereof broken away for the purposes of clarity and simplicity of illustration;
FIG. 3 is an exploded view of the reversing mechanism of the hand tool shown in FIGS. 1 and 2;
FIG. 4 is an elevational view taken on line 4—4 of FIG. 3 looking in the direction of the arrows;
FIG. 5 is an elevational view taken on line 5—5 of FIG. 3 looking in the direction of the arrows;
FIG. 6 is a sectional view taken on line 6—6 of FIG. 5 looking in the direction of the arrows;
FIG. 7 is an enlarged, partially broken away elevational view of the reversing mechanism in one of its operative positions;
FIG. 8 is an enlarged, partially broken away elevational view of the reversing mechanism in the other of its operative positions;
FIG. 9 is an enlarged, fragmentary view of one of the electrical contacts of the reversing mechanism in its disengaged position;
FIG. 10 is a view similar to FIG. 9, but showing the electrical contact intermediate its disengaged and contacting positions; and
FIG. 11 is a view similar to FIGS. 9 and 10, but showing the electrical contact in its contacting position.

Referring more particularly to the drawings wherein similar reference characters designate corresponding parts throughout the several views, FIG. 1 illustrates an electric hand tool designated generally at 10 which includes a housing formed to include a horizontally extending barrel 12 and a depending handle 14. The barrel 12 is constructed from a metallic material and carries a bridge or back cap 16 of plastic or other suitable insulating material adjacent its most rearwardly end. The handle 14, which is constructed from insulating material, supports the actuating means or trigger 18 and introduces the electrical leads 20 into the tool 10. The electrical leads 20 are connected to a source of electrical current (not shown) and are adapted to supply electrical current to the electric motor of the tool 10 upon actuation of the trigger 18.

The electric motor for operating the tool 10 is carried by the barrel 12 and, as will be seen from FIG. 2, comprises a shaft 22 having one end rotatably journalled in a bearing means 24 which is supported by a stationary housing member 26. The opposing end of the shaft 22 is similarly rotatably journalled in a bearing means (not shown) and is adapted to transmit the output of the electric motor to the chuck 28 of the tool 10.

An armature 30 including a plurality of armature coils 32 is fixedly secured upon the shaft 22 for conjoined rotation therewith and is operatively surrounded by the field structure of the electric motor. The field structure, more specifically, comprises a core 34 and its associated field coils 36 which are connected to the electrical leads 20 such as to be electrically energized upon actuation of the trigger 18 of the tool 10.

A commutator 38 is fixedly secured upon the shaft 22 adjacent an end of the armature 30 and includes a plurality of commutator bars 40 which are arranged circumferentially around the shaft 22. The commutator bars 40 are each connected to the armature coils 32 to electrically connect the commutator 38 with the armature 30.

A pair of diametrically opposing commutator brushes 42, as will be hereinafter more specifically shown, are carried circumferentially around the commutator 38 by the reversing mechanism which is provided by the present invention. Each of the commutator brushes 42 is biased by a spring or similar resilient member 44 into continuous engagement with the commutator bars 40 throughout the rotation of the shaft 22 and is electrically connected to the field coils 36 to receive electrical current therefrom during the operation of the electric motor. The commutator 38, the commutator brushes 42, and the reversing mechanism are all enclosed and double insulated by the back cap 16 which is carried by the barrel 12.

The reversing mechanism, more specifically, is disposed circumferentially around the commutator 38 intermediate the commutator 38 and the back cap 16. As will be seen from FIGS. 2 through 8, the reversing mechanism comprises a supporting member 46 constructed from plastic or similar insulating material which is formed to include a base portion 48 and a pair of opposing flange portions 50 which extend forwardly from the base portion 48 at diametrically opposing locations on the periphery thereof.

The base portion 48 of the supporting member 46 includes a centrally located opening 52 which is adapted to receive the shaft 22 to permit rotation thereof independently of the supporting member 46. Each of the flange portions 50 of the supporting member 46 includes a single, centrally located threaded bore 54 which is in longitudinal alignment with a bore 26a in the stationary housing member 26. The supporting member 46 is fixedly secured to the stationary housing member 26 by a plurality of threaded fastening members or screws 56 which pass through the aligned bores 54 and 26a, each of the screws 56 being insulated from the stationary housing member 26 by an insulating member 58 disposed intermediate each of the screws 56 and the stationary housing member 26.

The end of each of the flange portions 50 opposite to that secured to the stationary housing member 26 is formed to include a section 60 of reduced cross section which joins the remainder of the flange portion 50 such as to form a shoulder 62. A pair of threaded bores 64 are formed within each of the reduced sections 60 to facilitate the assembly of the reversing mechanism.

An annular contact carrying member 66 having a pair of diametrically opposing, arcuately extending flanges 68 is fixedly secured upon the supporting member 46 by a plurality of threaded fastening members or screws 70 which pass through the bores 72 in the annular flanges 68 and the bores 64 in the reduced sections 60. Thus, the contact carrying member 66 is retained by the reduced sections 60 in spaced relationship to the shoulders 62 on the flange portions 50. The contact carrying member 66 is constructed from plastic or similar insulating material and includes a centrally located opening 74 adapted to receive the commutator 38 to permit rotation thereof independently of the contact carrying member 66.

A first blade contact 76 is mounted intermediate each of the flanges 68 and the opening 74 on the side of the contact carrying member 66 facing the field coils 36. The first blade contacts 76 extend arcuately around the opening 74 and are each electrically connected to the field coils 36 to be electrically energized therethrough upon actuation of the trigger 18.

A second blade contact 78 is mounted intermediate each of the flanges 68 and the opening 74 on the side of the contact carrying member 66 facing the supporting member 46. The second blade contacts 78 are each formed to include a spring portion 82 and a substantially concave contacting portion 84 at each end of the spring portion 82 and, as will be seen from FIG. 4, are arranged in arcuately spaced relationship around the opening 74 such that each of the contacting portions 84 on one of the second blade contacts 78 is diametrically opposed to one of the contacting portions 84 on the other thereof. The first and second blade contacts 76 and 78, respectively, are secured upon the contact carrying member 66 by a common plurality of metallic fasteners or screws 80 such that electrical energization of the first blade contacts 76 effects electrical energization of the second blade contacts 78.

The brush holder ring member or carrier 86 which carries the commutator brushes 42 circumferentially of the commutator 38 is formed from plastic or similar insulating material and is wedged between the shoulders 62 on the supporting member 46 and the contact carrying member 66. The brush holder ring member 86, as will be seen from FIG. 3, is rotatable relative to the members 46 and 66 within an arc determined by the interaction of the arcuate projections 87 on the brush holder ring member 86 and the flanges 50 of the supporting member 46. In the illustrated embodiment of the invention, as will be seen from FIGS. 7 and 8, this interaction restricts the rotation of the brush holder ring member 86 to an arc of 42°. It will be understood, however, that this specified arcuate range of movement has been given by way of illustration only and may be altered as required to provide maximum operating efficiency of the electric motor.

The brush holder ring member 86 includes a centrally located opening 88 which is adapted to receive the commutator 38 to permit independent relative rotation of the brush holder ring member 86 and the commutator 38. A pair of diametrically opposing flanges 90 extend radially from the opening 88 and project externally from between the supporting member 46 and the contact carrying member 66.

A bore 92 is longitudinally formed through each of the flanges 90 and receives a metallic brush holder 94 which is formed to include a convex contacting portion 94a. The contacting portions 94a of the brush holders 94 cooperate with the contacting portions 84, as will be later herein shown, to transmit electrical energy from the field coils 36 to the commutator brushes 42. The commutator brushes 42 are slidably disposed within the brush holders 94 in engagement with the walls thereof by the springs 44 and the closure members or caps 96 which are threaded into the brush holders 94.

An annular groove 98 is formed within the brush holder ring member 86 on the side thereof facing the contact carrying member 66. The annular groove 98 is constructed and arranged to receive the second blade contacts 78 on the contact carrying member 66 and communicates with the bores 92 in the brush holder ring member 86 such that the contacting portion 94a on each of the brush holders 94 extends into the annular groove 98. Thus, the contacting portions 84 and 94a are enclosed by the walls of the annular groove 98 and the abutting face of the contact carrying member 66 and protected thereby from carbon dust or other foreign matter which might interfere with the operation of the reversing mechanism.

The relative longitudinal dimensions of the second blade contacts 78 and the annular groove 98, furthermore, are such as to permit simultaneous contact between the diametrically opposed contacting portions 84 of the second blade contacts 78 and the contacting portions 94a of the brush holders 94, but prevent simultaneous contact between each of the contacting portions 84 of the same second blade contact 78 with the contacting portions 94a. That is to say, the arcuate length of the annular groove 98 between the contacting portions 94a of each of the brush holders 94 is greater than the arcuate length of the second blade contacts 78 by such a length that the second blade contact 78 cannot be in simultaneous electrical contact with both of the brush holders 94. Thus, although rotation of the brush holder ring member 86 may be employed to reverse the flow of electrical current to the commutator 38, there is no danger of damage to the electric motor arising through simultaneous bidirectional current flow.

A projection or protrusion 100 of convex configuration is provided within the annular groove 98 for each of the contacting portions 84 and prevents creepage of the brush holder ring member 86. The protrusions 100 are arranged within the annular groove 98 such that rotation of the brush holder ring member 86 to place one pair of diametrically opposing contacting portions 84 in contact with the brush holders 94 automatically locates the other pair of diametrically opposing contacting portions 84 against their respective protrusions 100. For example, assuming the brush holder ring member 86 to be rotatable throughout an arc of 42°, (one of the protrusions 100 is located 42° on either side of the longitudinal axis of each of the brush holders 94. Thus, when the electric motor is in operation, each of the second blade contacts 78 is engaged by one of the protrusions 100 such as to hold the contacting portions 94a in positive electrical contact therewith.

From the foregoing, it will be seen that the contacting portions 94a of the brush holders 94 and the protrusions 100 provide the contacting portions 84 of the second blade contacts 78 with a positive make or break electrical connection and prevent contact creepage. Furthermore, due to the construction and location of the protrusions 100, it will be seen that the protrusions 100 also wipe from the contacting portions 84 any brass or other metallic particles they might receive from the contacting portions 94a of the brush holders 94. This wiping or cleaning of the contacting portions 84 eliminates the possibility that metallic particles of the contacting portions 94a might build up on the contacting portions 84 such as to cause contact burning and short circuiting or burning out of the electric motor and ensures that a good electrical connection is formed between the contacting portions 84 and the brush holders 94.

In order to facilitate the rotation of the brush holder ring member 86 to reverse the electric motor, each of the flanges 90 of the brush holder ring member 86 carries a radial projection 102 externally of the supporting member 46 and the contact carrying member 66. A slot 104 is provided within each of the radial projections 102 and receives a finger 106 carried by a rotatable reversing plate 108 which is disposed at the rearward end of the back cap 16. A plurality of lugs 110 are located upon the periphery of the reversing plate 108 and accessible to the operator of the tool 10 through a corresponding plurality of arcuately extending slots 112 formed in the back cap 16. Thus, the operator of the tool 10 may reverse its operation by rotating the reversing plate 108 until the proper pair of diametrically opposing contacting portions 84 of the second blade contacts 78 are in contact with the contacting portions 94a of the brush holders 94. Alternatively, however, the reversal of the operation of the tool 10 could be effected by rotation of the back cap 16 if the latter be made rotatable and provided with means for effecting conjoined rotation of the reversing plate 108.

The operation of the beforedescribed reversing mechanism is believed to be apparent from the foregoing description. However, by way of summary, a brief description of the operation of the reversing mechanism will now be given.

With the reversing mechanism as illustrated in FIG. 7, one of the pairs of diametrically opposing contacting portions 84 of the second blade contacts 78 makes electrical contact with the contacting portions 94a of the brush holders 94 such that electrical current is transmitted in one direction through the commutator brushes 42 to the commutator 38. The other pair of diametrically opposing contacting portions 84, as illustrated in FIG. 9, engages the protrusions 100 and is cleaned thereby of any foreign matter derived from the brush holders 94.

When reverse rotation of the electric motor is required, the brush holder ring member 86 is rotated 42° by means of the reversing plate 108 such that the formerly disengaged contacting portions 84, as shown in FIGS. 10 and 11, are urged over their respective protrusions 100 and enter contact with the contacting portions 94a of the brush holders 94. The formerly engaging contacting portions 84 are simultaneously returned to their respective protrusions 100, wiped and engaged thereby as shown in FIG. 9.

It will be seen that, in this manner, the rotation of the brush holder ring member 86 not only changes the contacting portions 84 in operative engagement with the brush holders 94, but also changes the positions of the commutator brushes 42 relative to the commutator 38. Thus, the direction of current flow to the commutator 38 is reversed by the rotation of the brush holder ring member 86.

In view of the foregoing description it will be seen that the reversing mechanism of the present invention, when disposed within an electric hand tool, requires no substantial increase in either the size or the bulk of the tool. It will also be seen that the annular groove 98 cooperates with the contact carrying member 66 to enclose the contacting portions 84 of the second blade contacts 78 and the contacting portions 94a of the brush holders 94 from carbon dust or other foreign matter which might interfere with their operation. Any foreign matter reaching the contacting portions 84 of the second blade contacts 78 is cleaned therefrom by the protrusions 100 before it can interfere with the operation of the reversing mechanism; and the second blade contacts 78 are held in positive engagement and disengagement by the contacting portions 94a of the brush holders 94 and the protrusions 100.

Also, in view of the foregoing, it will be seen that the reversing mechanism of the present invention includes substantially no possibility of contact creepage such as might accidently reverse the operation of the electric motor; and the reversing mechanism, while being simple and economical in construction, is a complete unit capable of being severally assembled. The back cap 16, being of insulating material, provides double insulation for the reversing mechanism.

From the foregoing, it will be seen that we have provided new and improved means for accomplishing all of the objects and advantages of our invention.

Having thus described our invention, we claim:

1. In combination with a reversible electric motor including a rotatable armature, a stationary field operatively adjacent said armature, a commutator operatively connected to said armature and rotatable therewith, and a plurality of commutator brushes cooperative with said commutator to transmit electrical current thereto; means for reversing the direction of rotation of said armature comprising:

supporting means including a contact carrying member;
    a carrier member carried by said supporting means
        circumferentially around said commutator for rotation relative to said commutator and having an annular groove therein;

a plurality of opposing brush holders carried by said carrier member for rotation therewith and having electrically conductive portions within said groove;

each of said brush holders carrying one of said commutator brushes in engagement with said commutator throughout the rotation thereof;

a plurality of stationary electrical contacts carried by said contact carrying member within said annular groove cooperative alternatively with each of said conductive portions of said brush holders upon rotation of said carrier member to transmit electrical current to said commutator brushes; and means disposed within said annular groove cooperative with said stationary contacts to restrain creepage of said conductive portions of said brush holders relative to said stationary contacts.

2. In combination with a reversible electric motor including a rotatable armature, a stationary field operatively adjacent said armature, a commutator operatively connected to said armature and rotatable therewith, and a plurality of commutator brushes cooperative with said commutator to transmit electrical current thereto; means for reversing the direction of rotation of said armature comprising:

supporting means including a contact carrying member;

a carrier member carried by said supporting means circumferentially around said commutator for rotation relative to said commutator and having an annular groove therein;

a plurality of opposing brush holders carried by said carrier member for rotation therewith and having electrically conductive portions within said annular groove;

each of said brush holders carrying one of said commutator brushes in engagement with said commutator throughout the rotation thereof;

a plurality of stationary electrical contacts carried by said contact carrying member within said annular groove cooperative alternatively with each of said conductive portions of said brush holders upon rotation of said carrier member to transmit electrical current to said commutator brushes; and means disposed within said annular groove cooperative with said stationary contacts to restrain creepage of said conductive portions of said brush holders relative to said stationary contacts;

said contact carrying member overlying said annular groove and being cooperative therewith to enclose said contacting portions of said brush holders and said stationary contacts from dust and other foreign matter.

3. In combination with a reversible electric motor including a rotatable armature, a stationary field operatively adjacent said armature, a commutator operatively connected to said armature and rotatable therewith, and a plurality of commutator brushes cooperative with said commutator to transmit electrical current thereto; means for reversing the direction of rotation of said armature comprising:

supporting means including a contact carrying member;

a carrier member carried by said supporting means circumferentially around said commutator for limited rotation relative to said commutator and having and annular groove therein;

a pair of opposing brush holders carried by said carrier member for rotation therewith and having electrically conductive portions within said annular groove;

each of said brush holders carrying one of said commutator brushes in engagement with said commutator throughout the rotation thereof;

a plurality of stationary electrical contacts carried by said contact carrying member within said annular groove cooperative alternatively with each of said conductive portions of said brush holders upon rotation of said carrier member to transmit electrical current to said commutator brushes;

said stationary contacts extending arcuately within said annular groove and carrying a contacting portion adjacent each of their opposing ends; and means carried by said carrier member within said annular groove cooperative with said stationary contacts to restrain creepage of said conductive portions of said brush holders relative to said stationary contacts;

said restraining means cooperating with the contacting portions of said stationary contacts alternatively upon their disengagement from said contacting portions of said brush holders to hold said carrier member against rotation.

4. A reversing means according to claim 3 wherein one of said restraining means and said contacting portions of said stationary contacts comprise a plurality of protrusions and the other thereof comprise a plurality of depressions adapted to be engaged by said protrusions to hold said carrier member against rotation.

5. A reversing means according to claim 3 wherein said restraining means comprise a plurality of arcuately arranged protrusions upon said carrier member and said protrusions are located such that rotation of said carrier member to engage one contacting portion of each of said stationary contacts with said contacting portions of said brush holders locates each of the disengaged contacting portions of said stationary contacts in engaging relation with one of said protrusions.

6. A reversing means according to claim 5 wherein said contact carrying member overlies said annular groove and cooperates therewith to completely enclose said contacting portion of said brush holders and said contacting portions of said stationary contacts from dirt and other foreign matter.

7. A reversing means according to claim 6 wherein said carrier member and said contact carrying member are formed of insulating material and are circumferentially enclosed with a housing of insulating material.

8. In combination with a reversible electric motor including a rotatable armature, a stationary field operatively adjacent said armature, a commutator operatively connected to said armature and rotatable therewith, and a plurality of commutator brushes cooperative with said commutator to transmit electrical current thereto; means for reversing the direction of rotation of said armature comprising:

first supporting means;

contact carrying member carried by said first supporting means;

a carrier member secured between said first supporting means and contact carrying member circumferentially around said commutator for limited rotation thereto, said carrier member including an annular groove therein;

a pair of opposing brush holders carried by said carrier member for rotation therewith and having electrically conductive portions extending into said annular groove;

each of said brush holders carrying one of said commutator brushes in engagement with said commutator throughout the rotation thereof;

a pair of stationary electrical contacts carried by said contact carrying member within said annular groove cooperative alternatively with each of said conductive portions of said brush holders upon rotation of said carrier member to either of its extreme positions to transmit electrical current to said commutator brushes;

said stationary contacts extending arcuately within said annular groove and carrying a contacting portion adjacent each of their opposing ends; and means disposed within said annular groove for restraining movement of said brush holders, said restraining means engaging each of the disengaged contacting portions of said stationary contacts when said carrier member has been rotated to engage the opposing contacting portions of said stationary contacts with said contacting portions of said brush holders;

said contact carrying member overlying said annular groove and forming therein a completely enclosed chamber for protecting said contacting portions of said brush holders and said stationary contacts from dust and other foreign matter.

9. A reversing means according to claim 8 wherein one of said restraining means and said contacting portions of said stationary contacts comprise a plurality of arcuately spaced protrusions and the other thereof comprise a plurality of cooperative depressions, and said carrier member and said contact carrying member are formed from insulating material.

10. A reversing means according to claim 9 wherein means are provided for effecting rotation of said carrier member; and said first supporting means, said contact carrying member, said carrier member, and said rotation effecting means are enclosed within a housing of insulating material, said housing including therein a slot communicating with said rotation effecting means for permitting access thereto.

11. An electrical switch comprising:
a first supporting means;
a plurality of electrical contacts carried by said first supporting means;
a second supporting means;
a plurality of arcuately extending electrical contacts carried by said second supporting means;
one of said first and second supporting means being rotatable relative to the other thereof to alternatively locate the opposing ends of each of said arcuately extending contacts in electrical engagement with said electrical contacts on said first supporting means; and
restraining means carried by said first supporting means cooperative with the disengaged ends of said arcuately extending electrical contacts for preventing rotation of said rotatable one of said first and second supporting means.

12. An electrical switch according to claim 11 wherein each of said arcuately extending electrical contacts includes an arcuately contoured contacting portion adjacent each of its opposing ends and said restraining means comprises a plurality of cooperatively contoured arcuate portions on said first supporting means.

13. In combination with a reversible electric motor including a rotatable armature, a stationary field operatively adjacent said armature, a commutator operatively connected to said armature and rotatable therewith, and a plurality of commutator brushes cooperative with said commutator to transmit electrical current thereto; means for reversing the direction of rotation of said armature comprising:
supporting means including a contact carrying member;
a carrier member carried by said supporting means circumferentially around said commutator for rotation relative to said commutator;
one of said contact carrying member and carrier member including an annular groove and said contact carrying member and carrier member cooperating to enclose said groove from the entry of dust and other foreign matter;
a plurality of opposing brush holders carried by said carrier member for rotation therewith and having electrically conductive portions in said groove;
each of said brush holders carrying one of said commutator brushes in engagement with said commutator;
a plurality of stationary electrical contacts carried by said contact carrying member in said annular groove cooperative alternatively with each of said conductive portions of said brush holders to transmit electrical current to said commutator brushes; and
means in said annular groove cooperative with said stationary contacts to restrain creepage of said conductive portions of said brush holders relative to said stationary contacts.

14. A reversing means according to claim 13 wherein said stationary electrical contacts each extend arcuately in said groove and each have opposite ends alternatively engageable with said brush holders, said restraining means cooperating with the disengaged ends of said stationary electrical contacts to restrain rotation of said carrier member.

References Cited

UNITED STATES PATENTS

| | | | |
|---|---|---|---|
| 2,500,571 | 3/1950 | Reynolds | 310—230 |
| 2,761,983 | 9/1956 | Koch | 310—241 |

ORIS L. RADER, *Primary Examiner.*

G. NUNEZ, *Assistant Examiner.*

U.S. Cl. X.R.

310—50, 241